A. M. HOFFMAN.
ROTARY CONVERTER FOR ELECTRIC WELDING.
APPLICATION FILED DEC. 23, 1907.

904,782.

Patented Nov. 24, 1908.

2 SHEETS—SHEET 1.

Witnesses

Inventor
A. M. Hoffman.
By ____, Attorneys

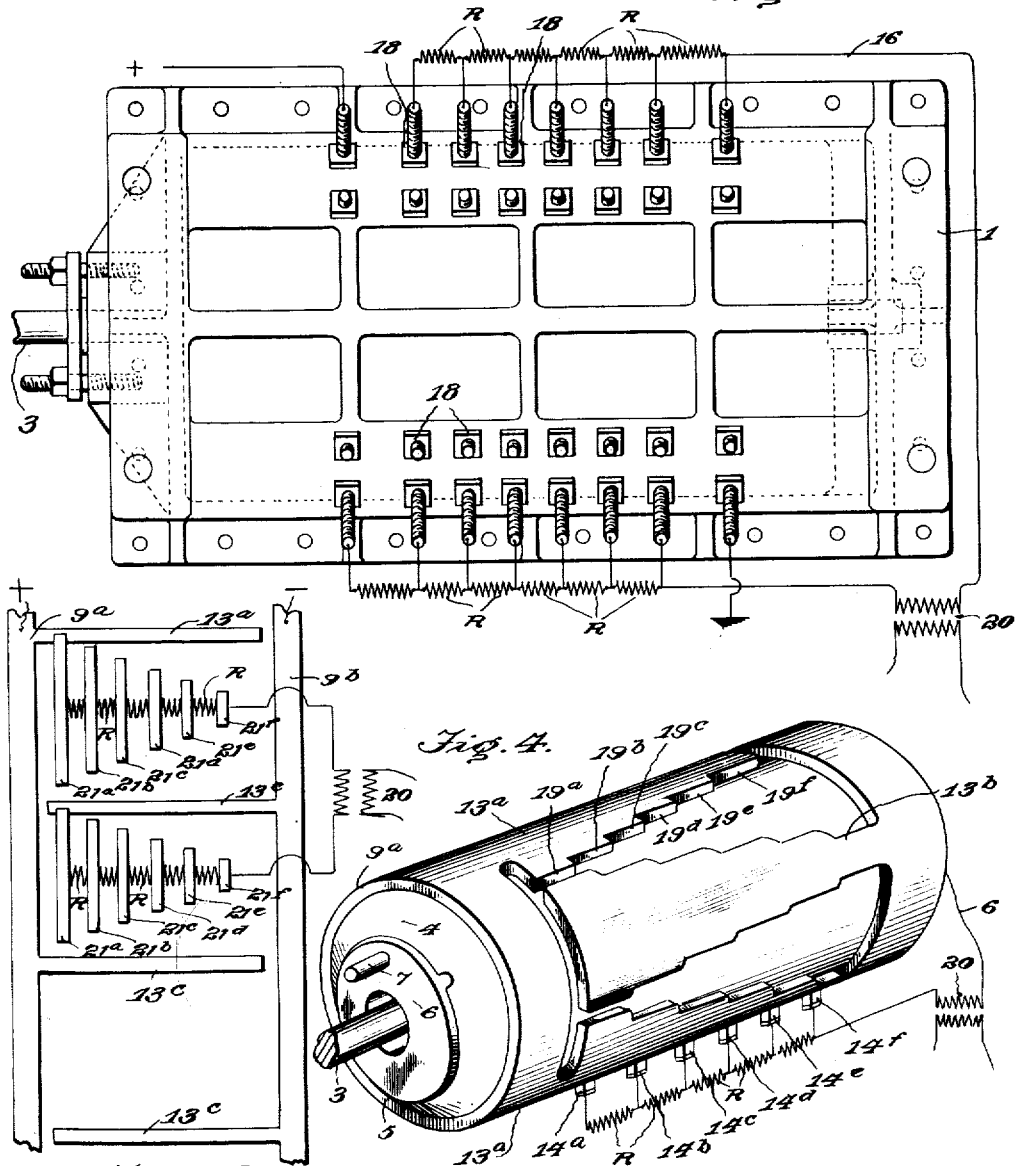

UNITED STATES PATENT OFFICE.

ARTHUR M. HOFFMAN, OF JOHNSTOWN, PENNSYLVANIA.

ROTARY CONVERTER FOR ELECTRIC WELDING.

No. 904,782.  Specification of Letters Patent.  Patented Nov. 24, 1908

Application filed December 23, 1907. Serial No. 407,866.

*To all whom it may concern:*

Be it known that I, ARTHUR M. HOFFMAN, citizen of the United States, residing at Johnstown, in the county of Cambria and State of Pennsylvania, have invented certain new and useful Improvements in Rotary Converters for Electric Welding, of which the following is a specification.

The present invention relates to a novel device for converting direct currents into alternating currents, and while it may be employed in such a capacity wherever it is desired to bring about such a result, it is particularly designed for use in connection with electric rail welding outfits.

The object of the invention is to provide a converter of this character which is simple and compact in its construction and can be readily employed for field work.

The invention further contemplates a novel construction whereby a continually varying resistance is introduced into the circuit of the alternating current, such a result being desirable under certain conditions of service.

Figure 1:
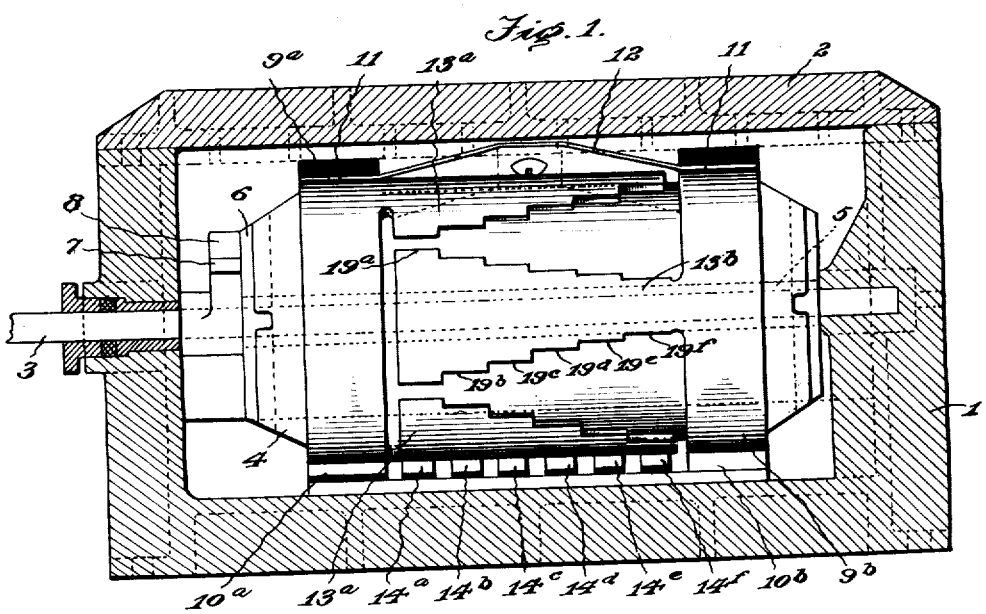
Figure 2:
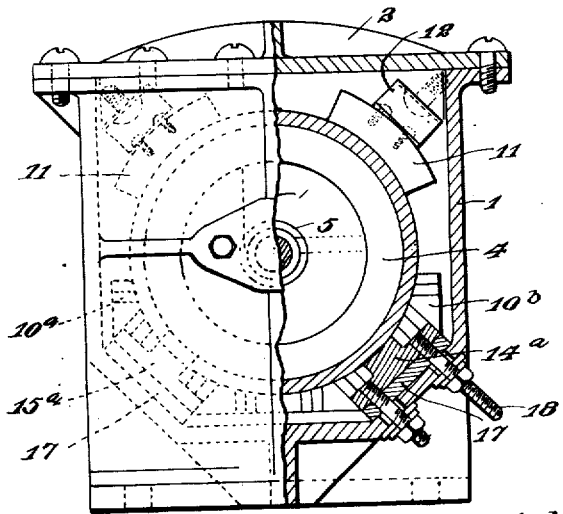

For a full description of the invention and the merits thereof and also to acquire a knowledge of the details of construction and the means for effecting the result, reference is to be had to the following description and accompanying drawings, in which:

Figure 1 is a vertical longitudinal sectional view through the device, the rotor being shown in side elevation. Fig. 2 is an end view of the device, portions thereof being broken away. Fig. 3 is a bottom plan view of the device. Fig. 4 is a detail view of the rotor. Fig. 5 is a diagrammatic view showing a modification.

Corresponding and like parts are referred to in the following description and indicated in all the views of the drawings by the same reference characters.

Specifically describing the present embodiment of the invention the numeral 1 designates a casing which may be formed of cast iron or other suitable material and is normally closed by means of a cover 2, the said casing being designed to contain oil or like liquid for the purpose of preventing the formation of arcs as will be more apparent as the description proceeds. Journaled within the casing 1 is a shaft 3 one end of which projects upon the exterior of the casing and is designed to receive rotary movement from any suitable source of power. Arranged within the casing and mounted upon the shaft 3 is a rotor 4 which is of approximately cylindrical shape and is formed of some insulating material such as hard wood. The internal diameter of the opening 5 through this rotor is greater than the diameter of the shaft 3 and the said rotor is designed to be entirely supported by contacts as will be clearly set forth hereafter. In the present instance the opposite ends of the rotor are beveled and have the plates 6 applied thereto, one of the said plates carrying a projection 7 designed to be engaged by an arm 8 projecting laterally from the shaft and rigid therewith so as to cause the rotor to revolve with the shaft. Applied to opposite ends of the rotor 4 are the collector rings $9^a$ and $9^b$ which are designed to be in electrical connection with the terminals of the circuit for the direct current. In the present instance these collector rings engage the brushes or contact blocks $10^a$ and $10^b$ upon opposite sides of the bottom of the casing 1, the said brushes serving to support the entire weight of the rotor and the brush $10^a$ being connected to the trolley wire while the brush $10^b$ is grounded. For the purpose of holding the collector rings in a close engagement with the brushes $10^a$ and $10^b$ bearing blocks 11 of insulating material are provided which are spring pressed against the upper portion of the rotor. As shown on the drawings two of these bearing blocks 11 are located at each end of the rotor, corresponding bearing blocks being connected by the longitudinal spring strips 12 having intermediate portions thereof secured to the cover 2. It will thus be apparent that when the cover is in position the said blocks will engage the collector rings and tend to force the rotor 4 downwardly so as to produce a close contact between the said collector rings and the brushes.

A series of plates are arranged upon the surface of the rotor between the collector rings, alternate plates having an electrical connection with the respective collector rings. In the present construction four of these plates are provided, the plates $13^a$ being connected to the collector ring $9^a$ while the plates 13ᵇ are connected to the collector ring 9ᵇ. Arranged upon each side of the lower portion of the casing 1 is a plurality of contacts designed to engage the plates 13ᵃ and 13ᵇ, the contacts 14ᵃ, 14ᵇ, 14ᶜ, 14ᵈ, 14ᵉ and 14ᶠ being connected with one of the terminals of the circuit for the alternating current while the contacts 15ᵃ, 15ᵇ, 15ᶜ, 15ᵈ, 15ᵉ and 15ᶠ are connected to the opposite terminal of the said circuit. These two sets of contacts are spaced apart a distance corresponding to that between adjacent plates 13ᵃ and 13ᵇ so that when one set of contacts establishes electrical connection with one of the plates 13ᵃ, the opposite set of contacts will in a similar manner establish connection with one of the plates 13ᵇ. As the rotor is revolved it will be readily apparent that this condition will be constantly reversed and an alternating current produced within the circuit 16, the frequency of the current depending upon the speed with which the rotor is caused to revolve.

It will be observed that the various contacts of each series are insulated from the casing 1 by means of suitable strips of insulating material 17 and are held in position by bolts 18 which extend through the casing but are insulated therefrom. It will also be observed that the individual contacts of each series are connected by means of resistances R, the end contact 14ᶠ of one series being directly connected to one of the terminals of the circuit 16 for the alternating current while the end contact 15ᶠ of the opposite series is in a similar manner directly connected to the opposite terminal of the circuit. In the operation of the machine the various contacts of each series are designed to be brought successively into electrical connection with the plates 13ᵃ and 13ᵇ so as to gradually bring the various resistances R into the circuit and gradually cut them out of the same during each cycle. For this purpose the adjacent longitudinal edges of the plates 13ᵃ and 13ᵇ are given a stepped formation so that they gradually diverge from each other from one end of the rotor toward the opposite end. One of these steps is provided for each of the contacts and in the present instance the longitudinal edges of each plate are formed with steps 19ᵃ, 19ᵇ, 19ᶜ, 19ᵈ, 19ᵉ and 19ᶠ. With this construction it will be readily apparent that as the rotor 4 is revolved, the contact members 14ᵃ and 15ᵃ will first engage the steps 19ᵃ of adjacent plates 13ᵃ and 13ᵇ, and that the entire current within the circuit 16 will be forced to pass through all of the resistances R. As the rotor continues to revolve the contact members 14ᵇ and 15ᵇ will be brought into engagement with the steps 19ᵇ and one of the resistances R of each series will be cut out of the circuit 16. In this manner it will be readily apparent that all of the various resistances will be successively cut out as the rotor revolves and that when the contact members 14ᵈ and 15ᵈ are brought into engagement with the steps 19ᶠ there will be no resistance in the circuit 16 since the current will pass directly into the same. In an exactly analogous manner the resistances R will be again successively introduced in the circuit 16 as the various contact members move away from the corresponding steps of the plates 13ᵃ and 13ᵇ.

When it is desired to use the alternating current for rail welding purposes as in the present instance, the primary coil of a transformer 20 is introduced into the circuit 16 and the voltage thereby stepped down the desired amount and the amperage correspondingly increased. It is again desired to call attention to the fact that the casing 1 is filled with oil within which the rotor 4 operates, the said oil tending to prevent the formation of arcs and enabling the device to be employed in connection with high tension currents.

A modification is shown in Fig. 5 in which the plates of the rotor are not given a stepped formation but are in the nature of bars as indicated at 13ᶜ. The contact members however are gradually decreased in length from one end of the machine to the opposite end, the various resistances R being interposed between the adjacent contact members in a manner identical with that heretofore described. These contact members are designated by the reference characters 21ᵃ, 21ᵇ, 21ᶜ, 21ᵈ, 21ᵉ and 21ᶠ, the member 21ᵃ being the longest of the series and the member 21ᶠ being the shortest. As the rotor is revolved it will be readily apparent that when the contact member 21ᵃ engages the plates upon the rotor all of the various resistances R will be in series with the transformer, and that when the contact members 21ᵇ are brought into electrical connection with the plates, one of the resistances in each of the series of contact members will be cut out of the circuit. In this manner it will be readily apparent that all of the resistances will be successively cut out of the alternating current circuit and again cut into the circuit for every phase of the alternating current. The construction of the remainder of the machine is identical in the modification with that of the first described embodiment of the invention and the only difference resides in the fact that the contact members or brushes of the alternating current circuit are arranged in a stepped series instead of stepping the longitudinal edges of the plates upon the rotor.

Having thus described the invention, what is claimed as new is:

1. A device for converting a direct current into an alternating current comprising a rotor, a series of plates carried by the rotor, alternate plates having electrical connection with the opposite terminals of the direct current circuit, a series of contacts in connection with each terminal of the alternating current circuit, and resistances introduced between the individual contacts of each series, the said contacts of each series being designed to be brought successively into engagement with the plates so as to cut the resistances in and out of the circuit during each cycle.

2. A device for converting a direct current into an alternating current comprising a rotor, a plurality of plates carried by the rotor, alternate plates having electrical connection with the terminals of the direct current circuit and the edges of the plates having a stepped formation, a series of contacts in electrical connection with each terminal of the alternating current circuit, and resistances interposed between the individual contacts of each series, the stepped formation of the plates bringing the various contacts of each series into successive engagement therewith so as to cut the resistances in and out of the circuit during each cycle.

3. A device for converting a direct current into an alternating current comprising a rotor, collector rings mounted upon the rotor and having electrical connection with the opposite terminals of the direct current circuit, a series of plates carried by the rotor, alternate plates being in electrical connection with the respective collector rings, a series of contacts at each terminal of the alternating current circuit, and resistances interposed between the individual contacts of each series, the various contacts of each series being designed to be brought successively into and out of engagement with the plates so as to cut the resistances in and out of the alternating current circuit.

4. A device for converting a direct current into an alternating current comprising a rotor, collector rings mounted upon the rotor and having electrical connection with the opposite terminals of the direct current circuit, a plurality of plates carried by the rotor and having the edges thereof stepped, alternate plates being in electrical connection with the respective collector rings, a series of contacts at each terminal of the alternating current circuit, and resistances interposed between the individual contacts of each series, the stepped formation of the plates causing the individual contacts to be brought successively into and out of engagement with the plates so as to cut the resistances in and out of the alternating current circuit.

5. A device for converting a direct current into an alternating current comprising a plurality of plates having the edges thereof stepped, alternate plates having electrical connection with the opposite terminals of the direct current circuit, a series of contacts at each terminal of the alternating current circuit, resistances interposed between the various contacts of each series, and means for moving the before mentioned plates with respect to the contacts, the stepped formation of the plates causing the individual contacts of each series to be successively brought in and out of engagement therewith so as to cut the resistances in and out of the alternating current circuit.

6. A device of the character described comprising a shaft, a rotor loosely mounted upon the shaft, contact members serving to support the rotor, and means for causing the rotor to revolve with the shaft.

7. In a device of the character described, the combination of a shaft, a rotor loosely mounted upon the shaft, the opening through the rotor being larger than the shaft, means for causing the rotor to revolve with the shaft, and contact members serving to support the rotor.

8. In a device of the character described, the combination of a shaft, a rotor provided with an opening receiving the shaft, said opening being larger than the shaft, means for revolving the rotor, contact members serving to support the rotor, and yielding means for holding the rotor in engagement with the contacts.

9. In a device of the character described, the combination of a shaft, a rotor provided with an opening receiving the shaft and larger than the same, means for revolving the rotor, collector rings mounted upon the rotor, contact members engaging the collector rings to support the rotor, a plurality of plates carried by the rotor, alternate plates having electrical connection with the respective collector rings, and contacts for coöperating with the plates to convert a direct current into an alternating current.

10. In a device of the character described, the combination of a shaft, a rotor provided upon an opening receiving the shaft and larger than the same, means for revolving the rotor, collector rings mounted upon the rotor, contacts engaging the collector rings to support the rotor and having electrical connection with the terminals of a direct current circuit, blocks yieldingly engaging the collector rings to hold the same in close engagement with the before-mentioned contacts, a plurality of plates carried by the rotor, alternate plates being in electrical connection with the respective collector rings, and contacts having electrical connection with the terminals of an alternating current circuit and coöperating with the before-mentioned plates.

11. A device for converting a direct current into an alternating current comprising a plurality of plates, alternate plates having electrical connection with the opposite terminals of the direct current circuit, a series of contacts at each terminal of the alternating current circuit, resistances interposed between the various contacts of each series, and means for moving the before-mentioned plates with respect to the contacts, the contacts of each series being successively brought into and out of engagement with the plates so as to cut the resistances in and out of the alternating current circuit.

In testimony whereof I affix my signature in presence of two witnesses.

ARTHUR M. HOFFMAN. [L. S.]

Witnesses:
JOHN LIMGER,
ROBRT MINENGER.